United States Patent [19]

Thelen

[11] 4,373,782
[45] Feb. 15, 1983

[54] NON-POLARIZING THIN FILM EDGE FILTER

[75] Inventor: Alfred J. Thelen, Santa Rosa, Calif.

[73] Assignee: Optical Coating Laboratory, Inc., Santa Rosa, Calif.

[21] Appl. No.: 156,260

[22] Filed: Jun. 3, 1980

[51] Int. Cl.³ .......................... G02B 5/28; G02B 27/10
[52] U.S. Cl. ...................................... 350/166; 350/172
[58] Field of Search ................. 350/166, 164, 172, 173

[56] References Cited

PUBLICATIONS

Thelen, A. J., "Non-Polarizing Interference Films Inside a Glass Cube," *Applied Optics*, vol. 15, No. 12, Dec. 1976, pp. 2983–2985.
Thelen, A. J., "Avoidance or Enhancement of Polarization in Multilayers", *Journal of the Optical Society of America*, vol. 70, No. 1, Jan. 1980, pp. 118–121.
Baumeister, P. W., "Design of Multilayer Filters by Successive Approximations", *Journal of the Optical Society of America*, vol. 48, pp. 955–958 (1958).
Thelen, A. J. "Equivalent Layers in Multilayer Filters," *Journal of the Optical Society of America*, vol. 56, pp. 1533–1538 (1966).
Seeley, J. S., "Resolving Power of Multilayer Filters," *Journal of the Optical Society of America*, vol. 54, pp. 342–346 (1964).

*Primary Examiner*—Bruce Y. Arnold
*Attorney, Agent, or Firm*—Flehr, Hohbach, Test, Albritton & Herbert

[57] ABSTRACT

A thin film optical filter having a bandpass reflectance characteristic with one of the transition wavelength edges thereof being non-polarizing for radiation incident at a preselected non-normal angle. The filter comprises a transparent substrate and a multilayer thin film optical coating provided on one surface thereof. The optical coating includes a preselected number of alternate layers of a first higher refractive index dielectric material and a second lower refractive index dielectric material arranged as a sequence of dielectric multilayer stacks with intervening spacer layers formed of one of the dielectric materials. The optical thickness of the spacer layers is detuned from half-wave optical thickness to shift either the low wavelength transition edges or the high wavelength transition edges for the separate bandpass response characteristics for the two principal polarization planes substantially into alignment with each other. Various other dielectric stack designs utilizing detuned layers to accomplish the same alignment of wavelength transition edges are described. Simplex and duplex fiber optic communications systems utilizing non-polarizing edge filters of the thin film type are also disclosed.

12 Claims, 17 Drawing Figures

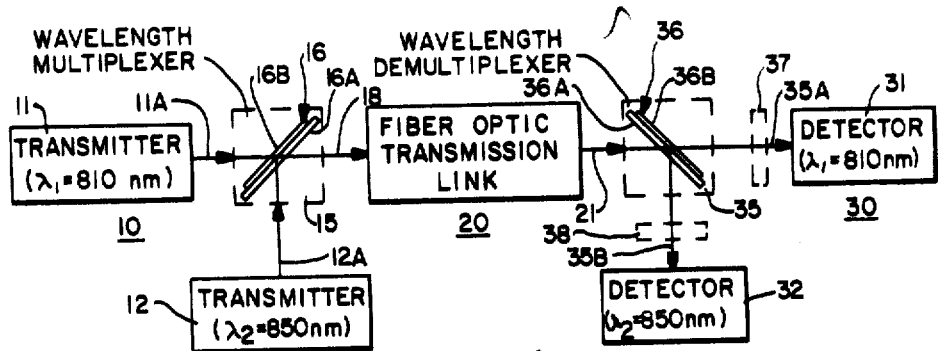
FIG.—1
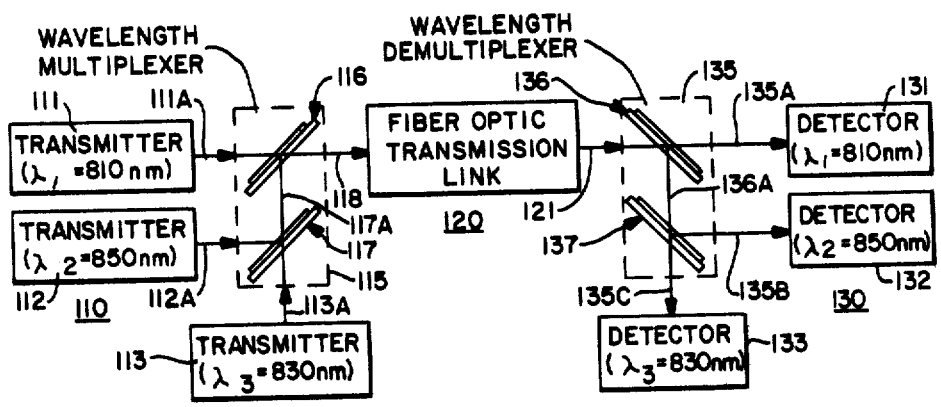
FIG.—2
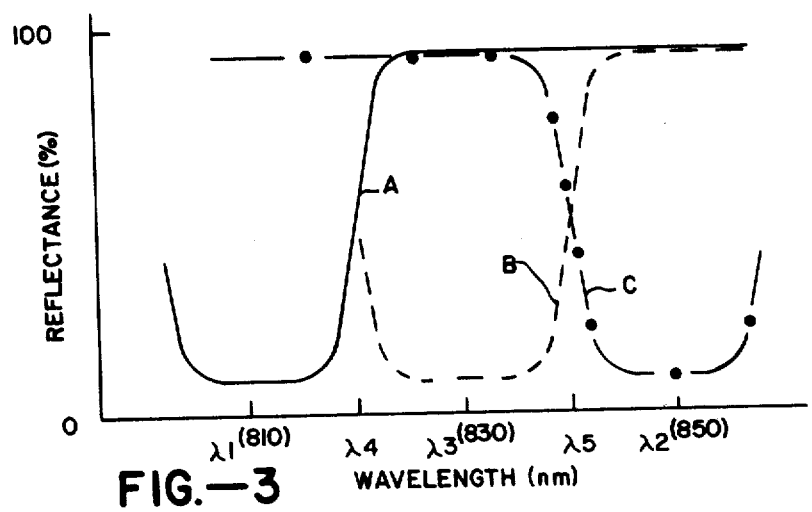
FIG.—3

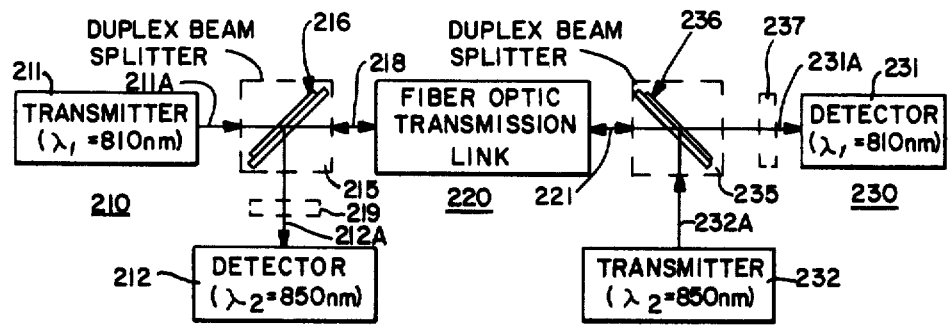
FIG.—4
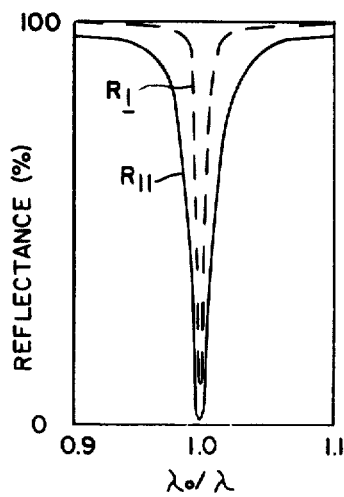
FIG.—5
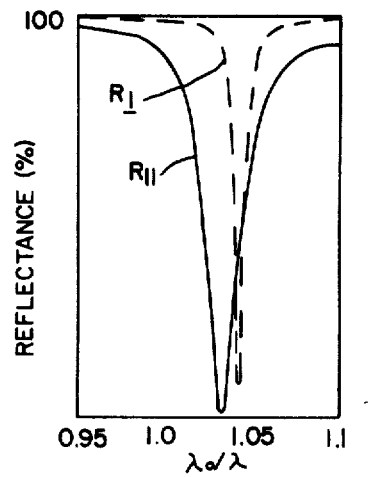
FIG.—8
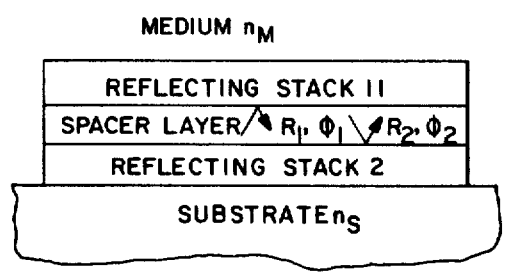
FIG.—6
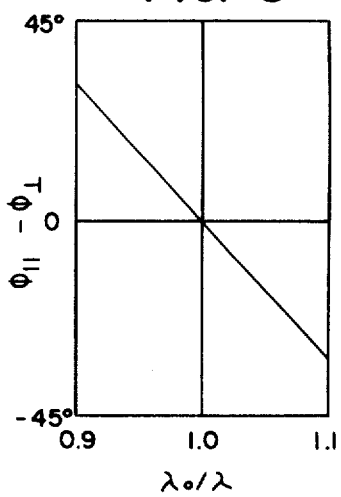
FIG.—7

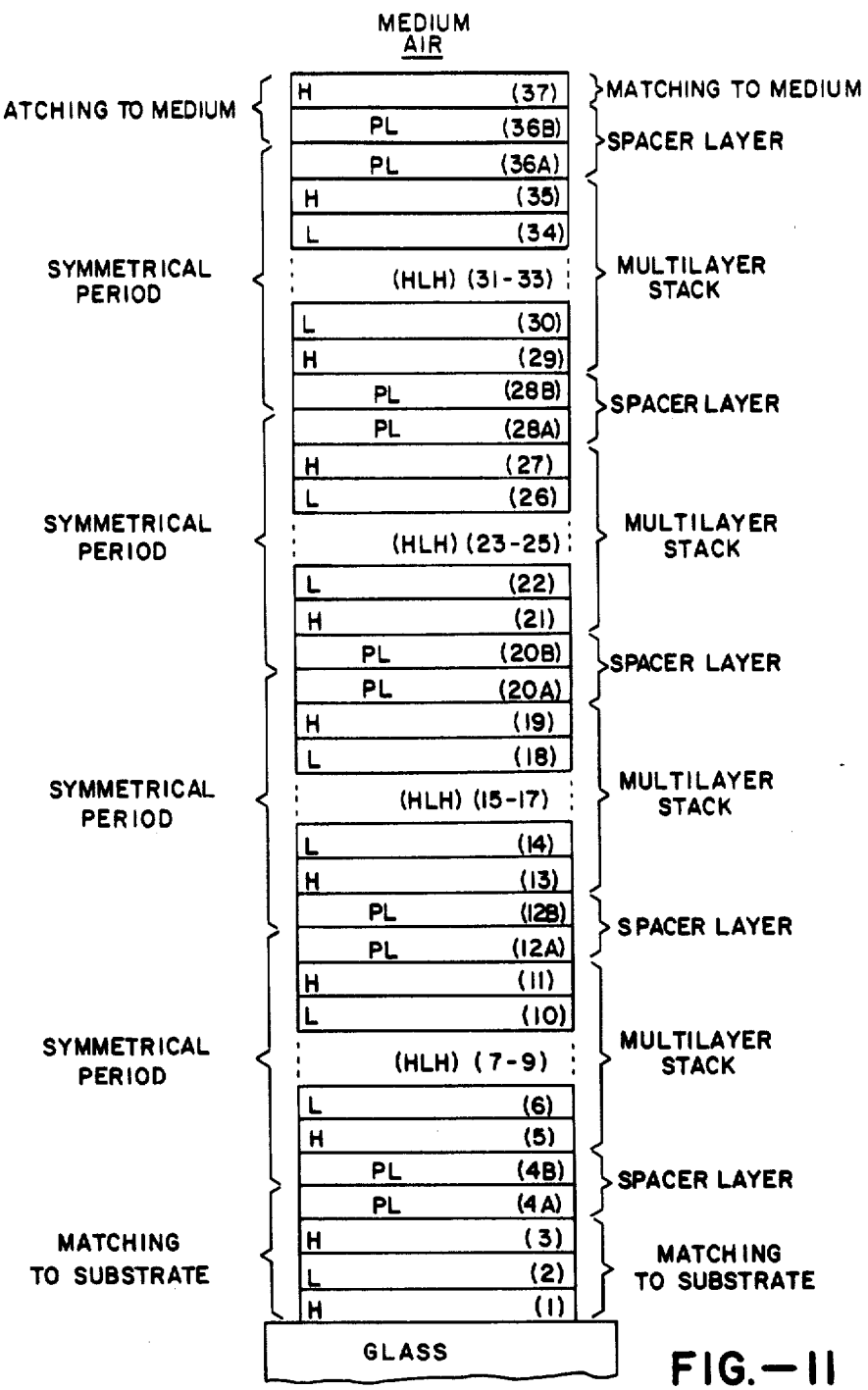
FIG.—11

NON-POLARIZING THIN FILM EDGE FILTER

This invention relates to thin film filters and more particularly to a thin film edge filter having a bandpass characteristic with a non-polarizing wavelength (or frequency) transition edge. One aspect of the invention relates specifically to a non-polarizing thin film filter adapted to be disposed at a preselected angle to the incident, transmitted, and reflected optical signal beams for producing wavelength division multiplexing or demultiplexing of these optical signal beams.

Over the past several years many improvements have been made in fiber optic transmission systems and these improvements have led to prototype installations of multifiber transmission links which have up to two megabit per second per channel transmission capability. Further improvements in the information transmitting capacity of fiber optic transmission channels may be achieved by further improvements in the optical fibers, the optical signal sources and the passive devices such as connectors and lenses. Another approach that may be taken to increasing the transmission capability of these systems involves wavelength division multiplexing of optical signal beams at different frequencies from two or more transmitters. The practical implementation of wavelength division multiplexing requires the availability of satisfactory optical signal multiplexers and demultiplexers at the transmitter and receiver ends of the fiber optic transmission link.

Various types of passive optical components are available for optical signal multiplexing and demultiplexing, such as, for example, diffraction gratings, prisms and thin film optical filters. Upon first consideration, thin film optical filters would appear to be an ideal approach to wavelength multiplexing and demultiplexing since multilayer thin film filters can readily be constructed to have either low pass, high pass, or bandpass filter characteristics having a very sharp transition edge between high reflectance and high transmittance regions for optical signals at different wavelengths. In addition, thin film optical filters would appear to be ideally suited to use in single fiber duplex links.

However, the optical signal multiplexing and demultiplexing environment requires that the multilayer thin film filter be positioned at an angle to the incident transmitted and reflected beams and this creates a problem for the multiplexing and demultiplexing of unpolarized monochromatic radiation. The problem involves the difference in spectral frequency response of the filter for the two principal planes of polarization of the radiation incident thereon at an angle, which shows up as a broadening of the rejection zone for one principal plane of the polarized light and a narrowing for the other principal plane of the polarized light due to the variations in the optical admittances of the thin films for these components. This is essentially equivalent to splitting of the edge transition positions which effectively reduces the sharpness of the wavelength transition edge for unpolarized light which is the mean of that for the two principal planes of polarization. This reduction in the sharpness of the wavelength transition edge of the thin film optical filter at non-normal incidence makes it difficult to achieve good separation, i.e., low crosstalk, between adjacent multiplexed channels having closely spaced center wavelengths, i.e. center wavelength spaced by two to five percent. While the phenomenon of thin film edge filter polarization can be mitigated to some extent by careful design of the thickness of the low and high refractive index material utilized in the thin film filter to reduce the sensitivity of the filter to the angle of incidence, such an approach tends to complicate the filter design and compromise other aspects of the filter performance and only minimizes rather than eliminates the polarization effect which continues to require that the adjacent signal wavelengths be separated by a minimum amount to achieve satisfactory adjacent channel rejection.

The problem of the polarization phenomenon of thin film edge filters at non-normal incidence could also be solved by polarizing the optical signal prior to multiplexing. However, polarizers produce a substantial loss in optical signal energy and thus substantially reduce the performance of the fiber optic signal channel.

Several approaches to designing non-polarizing thin film edge filters have been suggested in the prior art. One such approach is discussed in an article by the present inventor entitled "Non-Polarizing Interference Films Inside a Glass Cube," *Applied Optics*, Vol. 15, No. 12, December 1976, pp. 2983-2985. The filter design in this article uses three different dielectric materials and requires a careful matching of the indices of refraction of the different materials. If the indices of refraction of the materials are not matched or if different layers of the same material change their index from one layer to another, the filter no longer has a non-polarizing transition edge wavelength. Moreover, in general it is not possible to find a workable combination of the three materials required, i.e. materials with the proper indices of refraction and other suitable properties are not readily found. Another type of three-material design is set forth in a prior article by this inventor entitled "Avoidance or Enhancement of Polarization in Multilayers," *Journal of the Optical Society of America*, Vol. 70, No. 1, January 1980, pp. 118-121. This three-material design suffers from the same difficulties of refractive index matching as the aforementioned three-material design. A two-material design is also disclosed in the latter article. However, while it constitutes an improvement over the three-material designs, it requires a very high number of layers (i.e., around sixty layers) and the design is a special case only for the materials and layer thicknesses set forth. In other words, it is not adaptable to different dielectric materials and the number of layers involved renders the design impractical to implement from a commercial production standpoint.

Accordingly, it is a principal object of this invention to provide an improved thin film optical filter having at least one non-polarizing transition wavelength edge.

It is another object of this invention to provide a thin film optical filter having a bandpass characteristic with one of the transition wavelength edges thereof being non-polarizing for radiation incident at a preselected angle.

It is another object of this invention to provide a non-polarizing optical filter adapted to be disposed at a preselected angle to incident, transmitted, and reflected optical signal beams for producing wavelength division multiplexing or demultiplexing of the optical signal beams using at least a pair of wavelengths with center-to-center spacing in the range of two to five percent.

It is another object of this invention to provide an improved fiber optic communication system employing wavelength division multiplexing using thin film optical filters of a matched characteristic for the wavelength multiplexing and demultiplexing.

One aspect of this invention features a thin film optical filter having a bandpass reflectance characteristic with one of the transition wavelength edges thereof being non-polarizing for radiation incident at a preselected angle with the filter comprising a transparent substrate having a surface and a multilayer thin film optical coating provided on that surface. The coating includes a preselected number of alternate layers of a first higher refractive index dielectric material and a second lower refractive index dielectric material arranged as a sequence of dielectric multilayer stacks with intervening spacer layers formed of one of said dielectric materials. The layers of first and second dielectric material have optical thicknesses preselected to produce, for radiation incident at the preselected angle, a spectral response characteristic which has separate bandpass regions with separated low and high wavelength transition edges for the two principal polarization planes if the spacer layers were to have tuned optical thicknesses. Instead, the spacer layers have a detuned optical thickness prearranged in accordance with the preselected angle of incidence to shift either the low wavelength transition edges or the high wavelength transition edges substantially into alignment.

Another aspect of this invention features a non-polarizing optical filter adapted to be disposed at a preselected angle to incident, transmitted, and reflected optical signal beams for producing wavelength division multiplexing or demultiplexing of the optical signal beams using at least the first lower signal wavelength $\lambda_a$ and a second higher signal wavelength $\lambda_b$. The filter comprises a transparent substrate having a surface and a multilayer thin film optical coating formed on the surface with an edge filter optical response characterized by a high reflectance region including one of the signal wavelengths $\lambda_a$ or $\lambda_b$, a high transmittance region including the other of the signal wavelengths $\lambda_a$ or $\lambda_b$ and a non-polarizing transition edge at an intermediate wavelength $\lambda_c$. The multilayer thin film filter includes a plurality of symmetric dielectric periods, each comprising a preselected number of alternate layers of a first higher refractive index dielectric material and a second lower refractive index dielectric material having respective optical thicknesses preselected to produce a spectral response characteristic for signal beams incident at the preselected angle having separate bandpass regions with separated low and high wavelength transition edges for the two principal polarization planes if the first and last layers of said period were to have tuned optical thicknesses. Instead, the first and last layers are formed to a detuned optical thickness preselected in accordance with the preselected angle of incidence to shift either the low wavelength transition edge or the high wavelength transition edge substantially into alignment.

In accordance with another aspect of this invention, a fiber optic communication system is provided which includes at least one thin film optical filter in both the wavelength multiplexer and the wavelength demultiplexer, with each of the thin film optical filters utilizing a thin film optical coating having an edge filter optical response characterized by a high reflectance region including wavelength $\lambda_b$ and a high transmittance region including wavelength $\lambda_a$ and a non-polarizing transition edge at an intermediate wavelength $\lambda_c$. The multilayer thin film coating includes a plurality of symmetric dielectric periods utilizing only two different refractive index materials together with first and last layers of each period formed to a detuned optical thickness to shift either the low wavelength transition edge or high wavelength transition edge of the filter response for principal polarization planes substantially into alignment.

The edge filter design of this invention can be implemented utilizing between 20 and 40 thin film layers of only two dielectric materials to produce a non-polarizing edge filter response characteristic for radiation incident at a preselected angle. Since the design utilizes only two different dielectric materials, it is relatively insensitive to variations in the refractive index of the materials either from one thin film layer to another in the same filter, or between filters in a particular manufacturing run. This makes the filter design commercially feasible to produce, especially for applications such as fiber optic multiplexing and demultiplexing, since the filter can be produced on a relatively large substrate and subsequently diced into a plurality of filters of the required size. The non-polarizing edge filter design of this invention enables the effective multiplexing or demultiplexing of optical signals having center wavelengths separated by two to five percent. The filter is readily adaptable to a two-wavelength component multiplexing system and by judicious selection of the type of thin film filter together with the orientation of the transmitters at various wavelengths, three-signal multiplexing with center frequency separated by two-five percent may also be achieved. The thin film optical coating design which produces the non-polarizing edge filter characteristic is readily implemented as a symmetric coating design which permits the use of the same filter design for both multiplexing and demultiplexing, resulting in reciprocity between the multiplexer and demultiplexer. Accordingly, the non-polarizing edge filter of this invention permits the ready implementation of wavelength division multiplexing techniques with relatively inexpensive thin film optical filters and thus enables the doubling or tripling of the information-carrying capacity of a single fiber optic transmission channel.

In addition, the non-polarizing edge filter of this invention will permit the ready implementation of a single fiber duplex transmission link where the filter is used to separate transmitted and received beams of different wavelength at each end of the link.

Other objects, features and advantages of this invention will be apparent from the consideration of the following detailed description, taken in conjunction with the accompanying drawings.

FIG. 1 is a block schematic diagram of a fiber optic transmission system utilizing non-polarizing edge filters in accordance with this invention.

FIG. 2 is a block schematic diagram of a second embodiment of a fiber optic transmission system utilizing non-polarizing edge filters in accordance with this invention.

FIG. 3 is a graph depicting the spectral reflectance characteristics of non-polarizing edge filters utilized in the embodiments depicted in FIGS. 1 and 2.

FIG. 4 is a block schematic diagram of a duplex figer optic transmission system utilizing non-polarizing edge filters in accordance with this invention.

FIG. 5 is a graph depicting the spectral response characteristic of a filter useful in explaining the principles of this invention.

FIG. 6 is a schematic diagram of a thin film optical filter useful in explaining the principles of this invention.

FIG. 7 is a graph of phase angle differences useful in explaining the principles of this invention.

FIG. 8 is a graph depicting the spectral response characteristic of a filter useful in explaining the principles of this invention.

FIG. 11 is a schematic diagram of one embodiment of a thin film optical filter embodying the principles of this invention.

Figure 9:
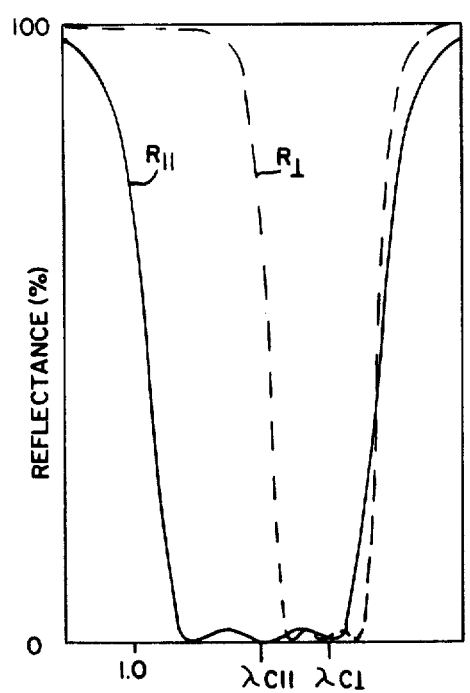
FIG. 9 is a graph depicting the spectral reflectance characteristic of a non-polarizing edge filter in accordance with this invention.

FIG. 1 depicts a single channel of a fiber optic transmission system which incorporates wavelength division multiplexing in the transmitter 10 with corresponding wavelength demultiplexing in the receiver 30 with the optical signal transmitted through the fiber optic transmission link 20 comprising a two-wavelength component multiplexed signal. The main components of the transmitter section 10 are a first transmitter 11 producing an output optical signal 11A at a first wavelength $\lambda_1$, a second transmitter 12 producing an output signal 12A at a center wavelength $\lambda_2$ and an optical signal multiplexer 15 which combines the output signals 11A and 12A into a wavelength division multiplexed optical signal 18. As is well known in the art, transmitters 11 and 12 may utilize gallium aluminum arsenide laser diodes to produce optical signals at wavelengths $\lambda_1 = 810$ nanometers and $\lambda_2 = 850$ nanometers, for example. These types of laser diodes are capable of operating at center wavelengths within the 800 to 900 nanometer wavelength range and the exemplary wavelengths utilized in this discussion are for purposes of illustration only. Moreover, other types of lasers producing signals at longer wavelengths could also be employed.

The main component of wavelength multiplexer 15 is a thin film optical filter 16 which essentially consists of a glass substrate 16A and a multilayer thin film optical coating 16B formed on one surface thereof. In an actual fiber optic transmission system, wavelength multiplexer 15 will typically include a system of lenses and couplers (not shown) which are provided in accordance with well known fiber optic technology.

The fiber optic transmission link 20 typically comprises a cable which consists of a plurality of optical fibers each carrying an optical signal. In this case a single optical fiber is designated for carrying the wavelength division multiplex signal 18 exiting the wavelength multiplexer 15. It should be apparent that in a typical fiber optic transmission system a plurality of transmitter sections 10 would be provided one each for the optical fibers in the transmission cable. Receiver section 30 of the fiber optic transmission system includes a first detector 31, a second detector 32, and a wavelength demultiplexer 35. Detectors 31 and 32 may comprise PIN diode detectors in accordance with standard fiber optic communication technology. Wavelength demultiplexer 35 includes a thin film optical filter 36 which consists essentially of a transparent glass substrate 36A with a multilayer thin film optical coating 36B formed thereon. Generally wavelength demultiplexer 35 will also include various lenses and other optical coupling media and may also include bandpass filters 37 and 38 in the paths of the output optical signals 35A and 35B to further reduce crosstalk between the signal channels associated with detectors 31 and 32.

Generally the thin film optical filter 16 in wavelength multiplexer 15 and the corresponding thin film optical filter 36 in wavelength demultiplexer 35 will be disposed at a 45 degree angle to the incident reflected and transmitted beams although angle tuning within a narrow range may be necessary during final assembly of the optical system to provide complementary, reciprocal response of the two filters. In accordance with this invention, the thin film optical filters 16 and 36 utilize thin film optical coatings 16B and 36B of a design which produces a non-polarizing edge filter characteristic despite the angular incidence of the related optical signal beams.

FIG. 3 shows an idealized spectral response curve for the thin film optical filters 16 and 36 for the exemplary case where $\lambda_1$ is 810 nanometers and $\lambda_2$ is 850 nanometers. As shown curve A has a bandpass region of low reflectance and corresponding high transmittance which includes the wavelength $\lambda_1$ and a region of high reflectance which includes the wavelength $\lambda_2$ and a transition region positioned at a third wavelength $\lambda_4$. Consequently, considering thin film optical filter 16, it should be apparent that the optical signal 11A incident thereon and having a wavelength of 810 nanometers will be essentially transmitted through filter and directly onto the output signal path 17. Due to the high reflectance of the filter at $\lambda_2 = 850$ nanometers the output optical signal 12A will be reflected by thin film filter 16 onto the same multiplexed output signal path 17. Again, it should be understood that various collecting and collimating lenses may be employed in the wavelength demultiplexer to assist in combining the two multiplexed signals into one signal beam. Output signal 17 thus will include two signal wavelength components at 810 nanometers and 850 nanometers.

The fiber optic transmission link 20 transmits the wavelength division multiplex signal 17 to provide a corresponding output signal 21 having the same wavelength components entering wavelength demultiplexer 35 at receiver 30. The thin film filter 36 in wavelength demultiplexer 30 has the same spectral response characteristic illustrated in curve A of FIG. 3. Accordingly, the $\lambda_1$ component of the multiplexed optical signal 21 will be directly transmitted through thin filter 36 to an output optical signal path 35A communicating with detector 31. Correspondingly, the $\lambda_2$ component of multiplexed optical signal 21 will be reflected by thin film optical filter 36 to an output optical signal path 35B communicating with detector 32.

FIG. 2 illustrates a wavelength division multiplexing system in which three separate transmitters 111, 112 and 113 are provided in transmitter section 110 and, correspondingly, three detectors 131, 132 and 133 are provided at receiver 130. In this embodiment, wavelength multiplexer 115 utilizes two separate thin film optical filters 116 and 117 to multiplex the three output signals 111A, 112A and 113A from transmitters 111, 112 and 113 into one signal path 118. Correspondingly, wavelength demultiplexer 135 utilizes two thin film filters 136 and 137 to demultiplex the three wavelength component input signal 121 into three output signals 135A, 135B and 135C, each having substantially a single wavelength optical signal component. Separate bandpass filters (not shown) may be utilized in the output signal paths to reduce crosstalk.

Referring to the spectral reflectance curves shown in FIG. 3, curve A represents the spectral reflectance characteristic of thin film filters 116 and 136 whereas curve B represents the spectral reflectance characteristics of thin film filters 117 and 137. The spectral response characteristics of the two filters are essentially identical in shape but the transition edge of curve B is at a wavelength $\lambda_5$ such that the low reflectance, high transmittance region of this filter includes the wavelength $\lambda_3$ and the wavelength $\lambda_2$ is in the high reflectance region of the spectral response for thin film optical filter 117 and 137. From these spectral response curves, it should be apparent that thin film filter 117 will transmit the optical signal 113A from transmitter 113 at $\lambda_3 = 830$ nanometers whereas it will reflect the output optical signal 112A from transmitter 112 at wavelength $\lambda_2 = 850$ nanometers. Accordingly, the optical signal on path 117A will include both optical signal components 112A and 113A. As this optical signal on path 117A is incident on thin film optical filter 116, both signal wavelength components therein will be reflected since both components are in the high reflectance region of thin film optical filter 116 as depicted by curve A in FIG. 3. The optical signal 111A from transmitter 111 will be transmitted through thin film optical filter 116 so that the output signal path 118 from wavelength multiplexer 115 will include optical signal components at all three wavelengths $\lambda_1$, $\lambda_2$ and $\lambda_3$.

Wavelength demultiplexer 135 operates on the different wavelength components of multiplexed optical signal 121 in the reciprocal fashion. Accordingly, thin film filter 136 having the reflectance characteristic depicted in curve A of FIG. 3 will transmit the $\lambda_1$ component to detector 131 and reflect both the $\lambda_2$ and $\lambda_3$ signal components onto a signal path 136A between filters 136 and 137. At filter 137, which has the spectral response characteristic of curve B in FIG. 3, the $\lambda_3$ signal component will be transmitted to detector 133 whereas the $\lambda_2$ signal component will be reflected to detector 132.

From the above discussion, it should be apparent that the particular transmitted and reflected optical signals at both the multiplexer and demultiplexer involve some freedom of design choice. For example, considering the system of FIG. 1, thin film filters 16 and 36 might be provided with a spectral reflectance characteristic corresponding substantially to curve C depicted in FIG. 3. Utilizing such a filter characteristic the transmitters 11 and 12 would be interchanged (or their wavelengths interchanged), so that the $\lambda_2$ optical signal would be transmitted and the $\lambda_1$ signal reflected by filter 16. Thin film filter 36 in wavelength demultiplexer 35 would preferably have the same spectral reflectance characteristic in order to provide for matching filter performance, but under certain conditions it would be possible to utilize transmission of $\lambda_1$ at the transmitter, through filter 16 and reflection of $\lambda_1$ in filter 36 at the receiver 30. Similar design choice is involved in the selection of the spectral response characteristic for filters 117 and 137 in the embodiment of FIG. 2. However, the spectral reflectance characteristics of some thin film filters in accordance with this invention suggest that the filters 116 and 136 are preferably designed to reflect two of the wavelength components and transmit only a single component. As will later be seen, the reason for this is that the width of the bandpass at low reflectance (high transmittance) is such that it can probably satisfactorily accommodate transmission of only one of the selected wavelengths for multiplexing and demultiplexing. Since matched filter characteristics are preferred in any event, this does not represent a substantial limitation in the utilization of thin film filters of this invention in effective three-wavelength multiplexing and demultiplexing fiber optic transmission systems.

FIG. 4 depicts a duplex fiber optic transmission link which employs a pair of transmitter-receiver stations 210 and 230 transmitting in both directions through a fiber optic link 220. The transmitter 211 at station 210 produces an optical output signal 211A at a wavelength $\lambda_1$ at, for example, 810 nanometers. This optical signal is incident on a duplex beam splitter 215 which utilizes a thin film optical filter 216. Optical signal beam 211A is transmitted through thin film filter 216 to a duplex signal path 218. This optical signal is transmitted through the fiber optic transmission link 220 to a duplex signal path 221 and is coupled into duplex beam splitter 235 at station 230. Duplex beams splitter 235 includes an optical filter 236 which transmits the wavelength $\lambda_1$ to a signal path 231A communicating with detector 231. A bandpass filter 237 may be included in this signal path is necessary. A transmitter 232 at station 230 produces an output optical signal 232A which is incident on the thin film optical filter 236 in duplex beam splitter 235. Filter 236 reflects optical signal 232A onto the duplex beam path 221 so it is transmitted through fiber optic transmission link 220 to duplex beam path 218. The thin film optical filter 216 in duplex beam splitter 215 reflects the signal at wavelength $\lambda_2$ onto a signal path 212A communicating with detector 212 at station 210. A bandpass filter 218 centered at the $\lambda_2$ wavelength and rejecting $\lambda_1$ may be included in this signal path. Each of the thin film optical filters 216 and 236 may have the spectral reflectance characteristic illustrated by Curve A in FIG. 3 such that the $\lambda_1$ wavelength is transmitted and the $\lambda_2$ wavelength is reflected at each filter.

FIGS. 5–8 illustrate with a simple filter design the principles on which this invention is based. FIG. 5 depicts the spectral reflectance of a typical, all dielectric, Fabry-Perot, narrow bandpass filter disposed at a 45 degree angle to the incident light. This particular filter has the following design:

1.0|(HLHLHLH)(LL)(HLHLHLH)|1.52.

For this filter each of the H and L layers is a quarter wave optical thickness matched to the incidence angle. The substrate is glass having the index of refraction of 1.52, the incident medium is air with an index of 1.0, the H layers have index of refraction $n_H = 2.28$, and the index of refraction of the L layers is $n_L = 1.45$. As FIG. 5 illustrates the spectral reflectance for the two principal planes of polarization, i.e. the parallel plane and the perpendicular plane, are different due the 45 degree angle of incidence of the light, but the curves are centered at the same wavenumber position.

FIG. 6 depicts the construction of such a filter as involving a reflecting stack 1 and a reflecting stack 2 with an intervening spacer layer. Correlating this with the design given above, the reflecting stacks 1 and 2 are the layers in the first and third parenthetical expression and the spacer layer is the two-quarter wave low index layers in the center of the design. As depicted in FIG. 6 the performance of the narrow bandpass filter is highly dependent on the optical characteristics of the spacer layer including the reflectance $R_1$ of the reflecting stack 1, the reflectance $R_2$ of the reflecting stack 2 and the corresponding phases of reflectance $\Phi_1$ and $\Phi_2$ of the stacks. As is well known the following formulas govern the performance of this filter:

$$T = \frac{(1 - R_1)(1 - R_2)}{(1 - R)^2} \cdot \frac{1}{1 + \frac{4R}{(1-R)^2} \sin^2 \textcircled{H}}$$

$$R = \sqrt{R_1 R_2}$$

$$\textcircled{H} = \frac{\pi}{2} \cdot \frac{\lambda_o}{\lambda}(2\rho s) - \frac{\Phi_1 + \Phi_2}{2}$$

$\rho_s$ is the detuning factor of the spacer layer and has a value of 1 in the case of a tuned spacer layer having the reflectance characteristic illustrated in FIG. 5. Since the reflectances $R_1$ and $R_2$ of the two reflecting stacks are nearly constant around the center wave number position $\lambda_o/\lambda = 1$, the position of the minimum reflectance is determined by $\theta = \pi$.

FIG. 7 depicts the value of the difference in phase angle of reflectance for the two principal planes of polarization in a seven-layer quarter wave stack at a 45 degree angle of incident light. It is seen that only at $\lambda_o/\lambda = 1$ is the phase difference zero. This invention is based on the discovery that by detuning the optical thickness of the spacer layer between the two reflecting stacks, it is possible to shift the center wavelengths of the respective minima of reflectance for the respective principal planes of polarization of different wavelength values. For example, if a 1.8L layer is used as the spacer layer instead of a 2L layer in the above design, the wave number position of the minima of reflectance for the two principal planes of polarization both shift to a higher wave number position but the wave number position of the minimum for the perpendicular plane shifts a greater amount than that of the parallel plane. If the optical thickness of the spacer layer were detuned in the other direction, i.e by using a spacer layer of optical thickness greater than two-quarter waves, the respective minima for the two principal planes of polarization would shift to a lower wave number, with (again) the minimum for the perpendicular plane of polarization shifting a greater amount than that for the parallel plane.

If one now considers a wider bandpass filter, it becomes apparent that by appropriate detuning of the optical thicknesses of appropriate layers in the filter it is possible to shift either the high or low wavelength transition edges of the filter for the two principal planes of polarization into substantial alignment with each other such that the overall response of the filter to unpolarized light has at least one non-polarizing transition wavelength edge. FIG. 9 depicts, with idealized waveforms, the concept of shifting the high wavelength transition edges of the separate bandpass regions for the two principal planes of polarization into substantial alignment with each other. This produces an effective edge filter with no polarization of the incident light in the high wavelength transition region. In applications where it is possible to ignore the response of the filter to the low wavelength transitions for the principal planes of polarization, it is effective to use this design principle in achieving a non-polarizing edge filter at substantial angles of incidence. It should be appreciated that the low wavelength transition edge for the perpendicular plane of polarization could be shifted into alignment with the low wavelength transition edge for the parallel plane of polarization and thus produce a non-polarizing edge filter at the low wavelength transition edge.

There are several types of bandpass thin film filter designs which may be utilized in implementing the principles of this invention. FIG. 11 illustrates generally a multiple half-wave filter which is an extension of the all dielectric, Fabry-Perot filter previously discussed. The construction of this multiple half-wave filter may be analyzed in two separate ways as shown in FIG. 11. Taking the description given in the right hand side of FIG. 11, it is seen that the basic structure of the filter involves a plurality of multilayer stacks with intervening spacer layers. Adjacent to the substrate are matching layers to optically match the filter to the substrate; and, the layer adjacent to the incident medium is a layer for matching to the medium. In the standard half-wave filter design, the layers of the multilayer stack consist of alternate layers of high and low refractive index material designated H and L on the drawing. These layers have substantially a quarter-wave optical thickness at the design wavelength. The spacer layer in the standard multiple half-wave filter are a half-wave optical thickness of one of the dielectric materials. For purposes of this discussion such a half-wave layer for the spacer layer, shown as two quarter wave layers in FIG. 11 is considered a tuned spacer layer. In FIG. 11 the designation of the two layers in the spacer layer is $\rho L$, where the symbol $\rho$ is used to designate a tuning factor which is equal to one in the case of a tuned spacer layer. In other words, the $\rho$ factor indicates a tuning variable on the optical thickness of the spacer layer. For example, if $\rho = 0.8$ then a $\rho L$ layer has an optical thickness which is eight-tenths of a quarterwave optical thickness. In the design shown in FIG. 11, each multilayer stack has the design HLHLHLH. In general, however, it should be understood that it is possible to express the design of each multilayer stack as a combination of layers ABA . . . ABA, where A and B stand for quarter wave thick layers at the design wavelength $\lambda_o$ having refractive indices $n_A$ or $n_B$, such that the letters A and B respectively designate either a high refractive index material or a low refractive index material. In other words, the first and last layers of the multilayer stack may be low index layers or high index layers depending on various design considerations.

Generally, to design a filter utilizing the principles of this invention, four steps are involved. The first step is to select a reflecting multi-layer stack as the basic building block of the filter. The second step is to detune the intervening spacer layers, i.e. determine a value for $\rho$, which will align the wavelength transition edges for the two planes of polarization either at the high wavelength transition edge or a low wavelength transition edge. Next determine the matching layers which minimize the secondary reflectance band. Finally, if desired, the secondary reflectance bands may be further reduced by submitting the design to a refining procedure as discussed by P. W. Baumeister in an article entitled "Design of Multilayer Filters By Successive Approximations", *Journal of the Optical Society of America*, Vol. 48, Page 955 (1958). By going through these steps and using established design techniques, it is possible to design a filter utilizing the principles of this invention by trial and error.

Figure 10A:
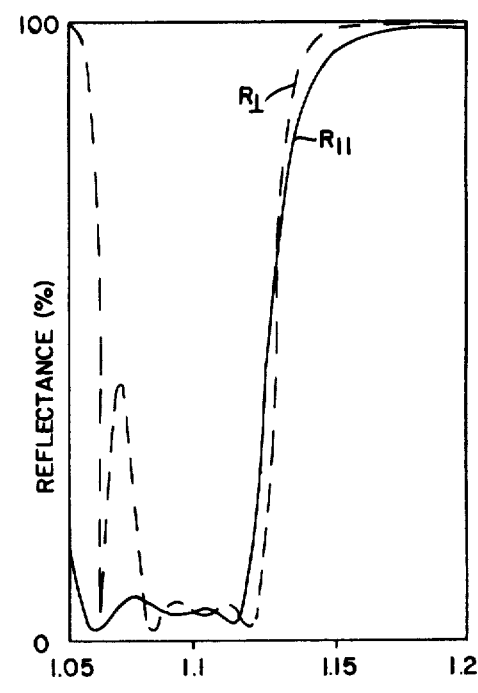
FIGS. 10A-10C are graphs of spectral reflectance characteristics of non-polarizing edge filters in accordance with this invention.
Figure 10B:
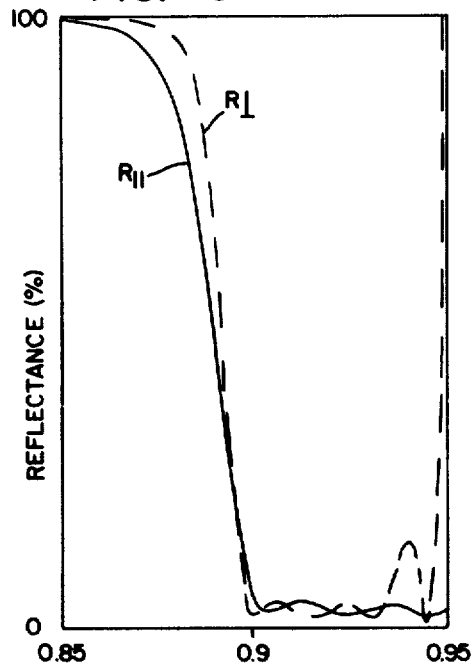

FIGS. 10A and 10B show the spectral reflectance for two filters of the type generally depicted in FIG. 11.

The filter design of FIG. 10A is a design where the detuning factor $\rho$ is set to 0.8 to align the high wavelength transition edges. For the filter design whose spectral reflectance is as depicted in FIG. 10B, the detuning factor $\rho$ is selected as 1.2 to align the low wavelength transition edges. In each instance the design utilizes glass as a substrate with an index of refraction of 1.52 and air as the surrounding medium with an index of refraction of 1.0. The H layers have an index of refraction $n_H = 2.28$, and the L layers have an index of refraction $n_L = 1.45$. In each instance the thicknesses of the layers in the stack and the detuning factor $\rho$ are selected for a 45 degree angle of incidence. In each instance the filter design has been subjected to the above-mentioned refining procedure which resulted in a design with thicknesses of the layers in accordance with the following table giving a % change from a quarterwave thick layer:

| layer number | low frequency pass % change | high frequency pass % change |
|---|---|---|
| 1 | −7.1 | −57.4 |
| 2 | −0.6 | +37.4 |
| 3 | +6.4 | −52.7 |
| 4 | +11.8 | −25.1 |
| 5 | +4.1 | +33.8 |
| 6 | −7.3 | −14.6 |
| 7 | −10.9 | − 7.5 |
| 8 | −3.6 | +15.1 |
| 9 | +10.2 | − 6.1 |
| 10 | −1.1 | + 0.5 |
| 11−25 | None | None |
| 26 | +0.9 | + 6.3 |
| 27 | −5.8 | −28.1 |
| 28 | −3.9 | − 4.1 |
| 29 | +4.1 | +13.6 |
| 30 | +9.9 | +21.3 |
| 31 | +4.1 | +16.1 |
| 32 | −7.5 | −14.3 |
| 33 | −10.5 | −39.5 |
| 34 | +5.6 | +17.2 |
| 35 | −10.3 | −39.4 |
| 36 | +4.2 | + 1.5 |
| 37 | +23.9 | +60.5 |

When the reflecting stack consists of only quarter wave thick layers, it is possible to derive an analytical expression for the detuning factor $\rho_s$. In order to do this, the description of a multiple half-wave filter shown on the righthand side of FIG. 11 can be modified to the following:

medium | matching layers ($\frac{1}{2}$ spacer, reflecting stack, $\frac{1}{2}$ spacer)$^\nu$ matching layers | substrate This is essentially the alternative description given on the left hand side of FIG. 11.

One-half of the spacer layers on both ends have been incorporated into the matching layers and the quantity $\nu$, specifying the multiplicity of the reflecting stacks, has been introduced. By constraining the configuration inside the brackets to be symmetrical, it is possible to apply the theory of equivalent layers to the design of multiple half-wave filters as set forth by this inventor in an article entitled, "Equivalent Layers in Multilayer Filters", *Journal of the Optical Society of America*, Vol. 56, p. 1533 (1966). According to this theory, the edges of a bandpass filter are characterized by the fact that the elements $M_{11}$ and $M_{22}$ of the matrix of the layer combination inside the brackets both are equal to $\pm 1$. The problem is to calculate the multilayer matrix of the combination $$\rho_s B\ A\ B\ A \ldots A\ \rho_s B$$

where A and B stand for layers one-quarter wave thick at the design wavelength $\lambda_o$ having refractive indices $n_A$ and $n_B$, respectively. The detuning factor $\rho_s$ specifies a different optical thickness for the spacer $\lambda_s = \rho_s \lambda_o$.

The matrix of the combination can be calculated from the following:

$$\begin{bmatrix} M_{11} & jM_{12} \\ jM_{21} & M_{22} \end{bmatrix} = \begin{bmatrix} \cos\alpha & j\frac{\sin\alpha}{n_B} \\ jn_B\sin\alpha & \cos\alpha \end{bmatrix} \begin{bmatrix} C_{11} & jC_{12} \\ jC_{21} & C_{22} \end{bmatrix} \begin{bmatrix} \cos\alpha & j\frac{\sin\alpha}{n_B} \\ jn_B\sin\alpha & \cos\alpha \end{bmatrix} \quad (1)$$

where $\alpha = \pi\lambda_s/2\lambda$ and C is the matrix of A B A ... A.

In an article entitled "Resolving Power of Multilayer Filters", *Journal of the Optical Society of America*, Vol. 54, p. 342 (1964), J. S. Seeley develops the expressions for the bandwidth of the Fabry-Perot filter and arrives at an approximate formula for the product of the matrices of a series of quarter wave layers. The formula is valid for wave numbers not too far removed from the position where the layers are quarter waves. Using Seeley's expressions, the following equations can be set forth:

$$C_{11} = (-1)^{(x-1)}\tfrac{1}{2}\sin\eta\{(n_A/n_B)^{(x-1)} + (n_A/n_B)^{(x-2)} + \ldots + (n_A/n_B)^{(1-x)}\} \quad (2)$$

$$C_{12} = (-1)^{(x-1)}/\{(n_A/n_B)^x n_B\}$$
$$C_{21} = (-1)^{(x-1)}(n_A/n_B)^x n_B$$
$$C_{22} = C_{11}$$

where $n = \pi\lambda_o/\lambda$ and x is the number of A-layers.

Inserting these expressions into the matrix equation (1) above, carrying out the matrix multiplications, and setting $M_{11} = \pm 1$, the following set of equations for the two planes of polarizations are produced:

$$\pm 1 = D_\parallel \sin\eta \cos 2\alpha - E_\parallel \sin 2\alpha \quad (3)$$
$$\pm 1 = D_\perp \sin\eta \cos 2\alpha - E_\perp \sin 2\alpha$$

where $$D = \tfrac{1}{2}(-1)^{(x-1)}\{(n_A/n_B)^{(x-1)} + (n_A/n_B)^{(x-2)} + \ldots + (n_A/n_B)^{(1-x)}\} \quad (4)$$

$$E = \tfrac{1}{2}(-1)^{(x-1)}\{(n_A/n_B)^x + (n_B/n_A)^x\}$$

The values for $D_\parallel$ and $E_\parallel$ are obtained by setting $$n_{A\parallel} = n_A/\cos\psi_A \text{ and } n_{B\parallel} = n_B/\cos\psi_B \quad (5)$$

and the values for $D_\perp$ and $E_\perp$ are obtained by setting $$n_{A\perp} = n_A \cos\psi_A \text{ and } n_{B\perp} = n_B \cos\psi_B \quad (6)$$

where $$n_{medium} \sin\psi_{medium} = n_A \sin\psi_A = n_B \sin\psi_B. \quad (7)$$

From equations (3), the following can be derived:

$$\sin 2\alpha = \pm \frac{D_\perp - D_\parallel}{D_\parallel E_\perp - D_\perp E_\parallel} \quad (8)$$

and

-continued $$\sin \eta = \frac{\pm 1 + E_{\parallel} \sin 2\alpha}{D_{\parallel} \cos 2\alpha} \quad (9)$$

which leads to $$\rho_s = \lambda_s/\lambda_o = 2\alpha/\eta \quad (10)$$

Using the above equation (10) it is possible to calculate the value of $\rho_s$ for the dielectric materials used in arriving at the filter designs whose spectral performance is depicted in FIGS. 10A and 10B. Accordingly, for dielectric materials having index of refraction $n_A = 2.28$ and $n_B = 1.45$, and using air as the medium, and $X = 4$, the calculated values for $\rho_s$ are $\rho_s = 1.14$ for a high pass edge filter and $\rho_s = 0.86$ or a low pass edge filter. If a glass medium is used having an index of refraction of 1.52, the calculated values are $\rho_s = 1.20$ for a high frequency bandpass and $\rho_s = 0.80$ for a low frequency bandpass. The latter case would involve a design where the optical coating is sandwiched between a pair of glass substrates such as is described in the Applied Optics article referenced above.

Since the formulas used for these calculations involve approximations, it will be appreciated that the calculated values for $\rho_s$ are also approximations which need to be refined by trial and error to obtain a filter with appropriate alignment of the low or high wavelength transition edges for the two principal planes of polarization. Thus, it will be seen that the actual values of $\rho_s$ for the filters whose performance is depicted in FIGS. 10A and 10B are 1.20 and 0.80, respectively. For the case of glass as an incident medium the actual $\rho_s$ values turn out to be 1.25 and 0.80, respectively. The spectral performance graphs for the filter layer cemented in a glass cube are not depicted. They are generally comparable to those depicted in FIGS. 10A and 10B except that the reflectance curve for the parallel plane of polarization has a transition edge which is somewhat less sharp than that for the perpendicular plane of polarization so that the overall filter performance is somewhat degraded from the filter using air as the incident medium. It should be appreciated that in each instance the overall spectral performance of the filter to unpolarized light would comprise the mean of the spectral characteristic for the two principal planes of polarization. However, at the aligned wavelength transition edge of the filter, the performance for non-polarized light is only slightly degraded, and for many applications the fact that the steepness for the edges for the two principal polarization planes is somewhat different is of no consequence.

Figure 10C:
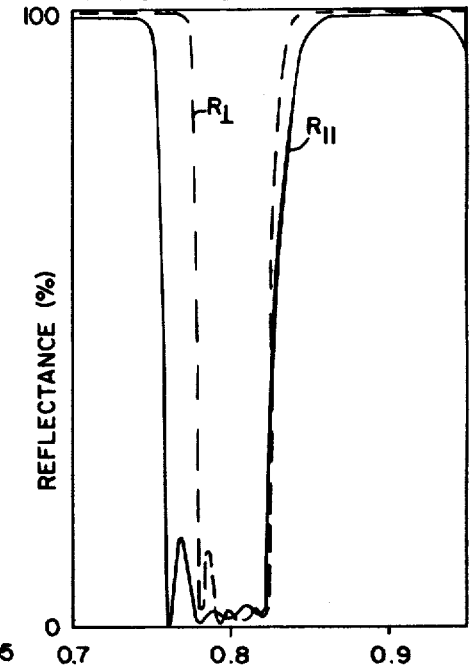

FIG. 10C depicts the spectral reflectance versus actual wavelength for a particular filter design generally corresponding to FIG. 10A. This filter would have the characteristics required for use in the transmission systems depicted in FIGS. 1, 2 and 4.

Figure 12A:
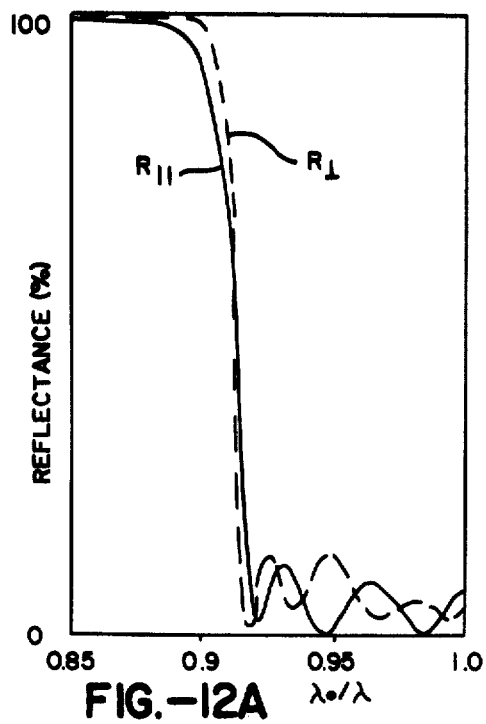
FIGS. 12A-12D are graphs of spectral reflectance characteristics of another embodiment of a non-polarizing edge filter in accordance with this invention.

FIG. 12A depicts the spectral reflectance characteristic for a different bandpass filter design utilizing a different reflecting stack design. The configuration for this filter is the following:

medium | matching layers $$\left( \rho_s \frac{4}{3} B \frac{2}{3} A \frac{4}{3} B \ldots \frac{2}{3} A \rho_s \frac{4}{3} B \right)^v$$

matching layers | substrate

For the case depicted in FIG. 12A the actual filter design is as follows:

1.0 | H 1.02Z Z$^4$ 1.02Z HLH | 1.52, where Z is a reflecting stack having the following design:

Z = 1.3H 0.6L 1.2H 0.6L 1.2H 0.6L 1.3H.

For this case the high index material has an index of refraction $n_H = 2.28$ and the low index material has an index of refraction $n_L = 1.45$. The design is for a 45 degree angle of incidence. The factors 0.6 and 1.2 represent approximations to the values ½ and 4/3, respectively, which are close enough to establish the starting design. In this case the detuning factor $\rho_s$ is equal to 1.08 which gives the value 1.3H for the first and last layers in each stack.

Figure 12B:
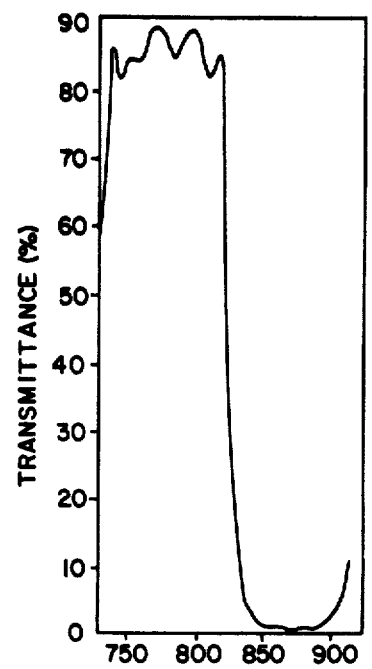
Figure 12C:
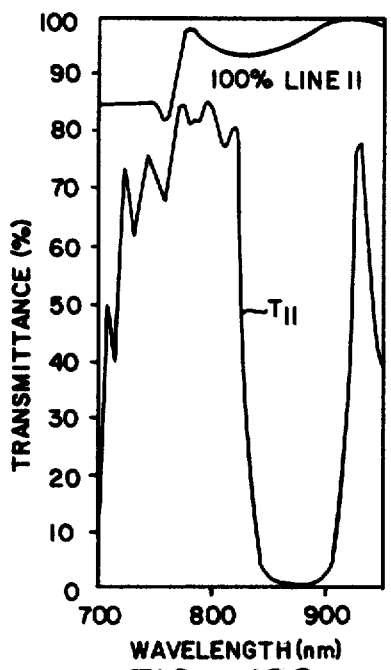
Figure 12D:
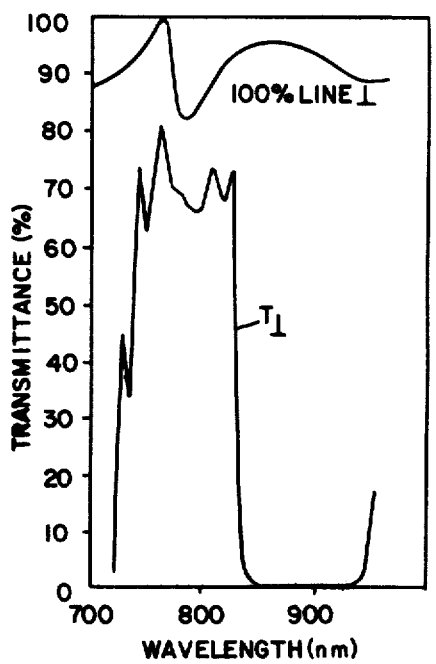

FIG. 12B depicts the measured spectral performance of an actual filter built according to this reflecting stack design. In FIG. 12B transmittance is plotted verus wavelength and the design of the filter whose performance is depicted in FIG. 12B is for a non-polarizing transition edge at the high wavelength value, contrasted to the low wavelength transition edge alignment depicted in FIG. 12A. FIGS. 12C and 12D depict the measurement of transmittance versus wavelength for the parallel and perpendicular planes of polarization, respectively. At the top of each of the graphs of FIG. 12C and 12D the 100% line of the instrument is plotted, and this graph shows that the instrument was not operating perfectly with a flat 100% line across all measured wavelengths. Consequently, the actual values of the spectral transmittance at each wavelength would have to be arrived at by ratioing the measured value in the lower graph to the value for the 100% line in the upper graph. In each case, however, the measured spectral transmittance demonstrates the principle of aligning the wavelength transition edges for the two planes of polarization in accordance with this invention. It can be seen from the comparison of the transition edges in FIGS. 12C and 12D that both wavelength transition edges occur at about 825 nanometers and are thus substantially aligned with each other.

Referring to 12B and comparing it to the spectral reflectance curve A depicted in FIG. 3, it should be apparent that the filter whose performance is depicted in FIG. 12B could be utilized for the wavelength multiplexing and demultiplexing in the fiber optic transmission system depicted in FIG. 1. The filter depicted in FIG. 12B has high transmittance (low reflectance) at a wavelength of 810 nanometers and has high reflectance and low transmittance at a wavelength of 850 nanometers. Since this particular filter has a wider bandpass it would be possible to use it in a fiber optic transmission system in which three wavelength multiplexing and demultiplexing is accomplished by transmitting two wavelength components rather than reflecting two wavelength components in one of the filters. The design of an arrangement of thin film filters to accomplish this approach to multiplexing and demultiplexing would be readily apparent to persons in this art.

Another practical filter design would utilize the reverse of the one discussed above and have the following configuration:

medium | matching layers $$\left( \rho_s \frac{2}{3} B \frac{4}{3} A \frac{2}{3} B \ldots \frac{4}{3} A \frac{2}{3} B \frac{4}{3} A \rho_s \frac{2}{3} B \right)^\nu$$

matching layers | substrate

The general case of this filter design is thus medium | matching layers ($\rho_s$bB aA bB ... aA bB aA $\rho_s$bB) matching layers | substrate where a and b are layer thickness design factors consisting of a=⅔, 4/3 or a=4/3, b=⅔. As noted above these design factors may be approximated in an actual filter design.

The above descriptions of the principles on which this invention is based and several embodiments of actual filter designs utilizing the principles of this invention are given by way of example only. It should be apparent that persons skilled in this art could design numerous other filters and make numerous modifications in the disclosed embodiments without departing from the principles of the invention as set forth in the following claims.

What is claimed is:

1. A thin film optical filter having a bandpass reflectance characteristic with one of the transition wavelength edges thereof being non-polarizing for radiation incident at a preselected non-normal angle, said filter comprising: a transparent substrate having a surface; and a multilayer thin film optical coating provided on said surface, said optical coating including a preselected number of alternate layers of a first higher refractive index dielectric material and a second lower refractive index dielectric material arranged as a sequence of dielectric multilayer stacks with intervening spacer layers formed of one of said dielectric materials, said layers of first and second material in said multilayer stacks having optical thicknesses preselected to produce, for radiation incident at said preselected angle, a spectral response characteristic which has separate bandpass regions with separated low and high wavelength transition edges for the two principal polarization planes if said spacer layers were to have tuned optical thickness, said spacer layers having detuned optical thickness prearranged in accordance with said preselected angle to shift either said low wavelength transition edges or said high wavelength transition edges substantially into alignment.

2. The article of claim 1, wherein said multilayer thin film optical coating further includes a thin film understructure on said surface for optical matching of said coating to said substrate, and a thin film overstructure for optical matching of said coating to the surrounding medium; and wherein each of said dielectric stacks is a symmetrical period of said thin film layers, and wherein detuned spacer layers are interposed between the first of said dielectric stacks and said thin film understructure and the last of said dielectric stacks and said overstructure.

3. A non-polarizing optical filter adapted to be disposed at a preselected non-normal angle to incident, transmitted, and reflected optical signal beams for producing wavelength division multiplexing or demultiplexing of said optical signal beams using at least a first lower signal wavelength $\lambda_a$ and a second higher signal wavelength $\lambda_b$, said filter comprising: a transparent substrate having a surface; and a multilayer thin film optical coating formed on said surface and having an edge filter optical response characterized by a high reflectance region including one of said signal wavelengths $\lambda_a$ or $\lambda_b$, a high transmittance region including the other of said signal wavelengths $\lambda_a$ or $\lambda_b$ and a non-polarizing transition edge at an intermediate wavelength $\lambda_c$, said multilayer thin film filter including a plurality of symmetric dielectric periods, each comprising a preselected number of alternate layers of a first higher refractive index dielectric material and a second lower refractive index dielectric material having respective optical thicknesses preselected to produce a spectral response characteristic for signal beams incident at said preselected angle having separate bandpass regions with separated low and high wavelength transition edges for the two principal polarization planes if the first and last layers of said periods have tuned optical thickness, said first and last layers being formed to a detuned optical thickness preselected in accordance with said preselected angle of incidence to shift either said low wavelength transition edges or said high wavelength transition edges substantially into alignment.

4. The article of claim 3, wherein said multilayer thin film optical coating further includes a thin film understructure on said surface for optical matching to said substrate and a thin film overstructure for optical matching to the surrounding medium; each of said understructure and said overstructure comprising a mutilayer of said first and second dielectric materials and including a layer of detuned optical thickness matching that of the detuned layers in the symmetric multilayer stack.

5. A thin film optical filter having a bandpass reflectance characteristic with one of the transition wavelength edges thereof being non-polarizing for radiation incident at a preselected non-normal angle, said filter comprising: a transparent substrate having a surface; and a multilayer thin film optical coating provided on said surface, said optical coating including a preselected number of alternate layers of a first higher refractive index dielectric material and a second lower refractive index dielectric material arranged in the following design configuration:

Medium
(Matching layers)

$(\rho_s B \rho_s B)_1$ $(A_1 B_2 A_3 \ldots A_x)_1$ $(\rho_s B \rho_s B)_2$

.
.

$(\rho_s B \rho_s B)_\nu$
$(A_1 B_2 A_3 \ldots A_x)_\nu$ $(\rho_s B \rho_s B)_{\nu+1}$ (Matching layers)
Substrate where A and B generally designate quarter-wave layers of said dielectric materials, X designates a preselected number of layers in each reflecting stack, $v$ designates a preselected number of reflective stacks in said coating, the subscripts on the letters A and B designate the layer number within each stack and the subscripts on the parenthetical expressions designate the stack number, and $\rho_s$ designates a detuning factor having a value either less than or greater than one and prearranged in accordance with said preselected angle such that either the low or high wavelength transition edges of the spectral response of said filter for the two principal polarization planes are substantially aligned.

6. The filter of claim 5, wherein said matching layers adjacent to the substrate and medium are designed to reduce secondary reflectance bands in a bandpass region of interest and wherein the optical thicknesses of selected ones of said A and B layers are refined to reduce secondary reflectance bands in a bandpass region of interest.

7. A thin film optical filter having a bandpass reflectance characteristic with one of the transition wavelength edges thereof being non-polarizing for radiation incident at a preselected non-normal angle, said filter comprising: a transparent substrate having a surface; and a multilayer thin film optical coating provided on said surface, said optical coating including a preselected number of alternate layers of a first higher refractive index dielectric material and a second lower refractive index dielectric material arranged in the following design configuration:

Medium
(matching layers including $\rho_s B$)

$(\rho_s B_1 \, A_2 \, B_3 \ldots A_{x-1} \rho_s B_x)_1$

.
.
.

$(\rho_s B_1 \, A_2 \, B_3 \ldots A_{x-1} \rho_s B_x)_v$ (matching layers including $\rho_s B$)
Substrate where A and B generally designate quarter-wave layers of said dielectric materials, X designates a preselected number of layers in each reflecting stack, $v$ designates a preselected number of reflective stacks in said coating, and $\rho_s$ designates a detuning factor having a value either less than or greater than one and prearranged in accordance with said preselected angle such that either the low or high wavelength transition edges of the spectral response of said filter for the two principal polarization planes are substantially aligned.

8. The filter of claim 7, wherein said matching layers adjacent to the substrate and medium are designed to reduce secondary reflectance bands in a bandpass region of interest and wherein the optical thicknesses of selected ones of said A and B layers are refined to reduce secondary reflectance bands in a bandpass region of interest.

9. A thin film optical filter having a bandpass reflectance characteristic with one of the transition wavelength edges thereof being non-polarizing for radiation incident at a preselected non-normal angle, said filter comprising: a transparent substrate having a surface; and a multilayer thin film optical coating provided on said surface, said optical coating including a preselected number of alternate layers of a first higher refractive index dielectric material and a second lower refractive index dielectric material arranged in the following design configuration:

Medium
(matching layers)

$(\rho_s bB_1 \, aA_2 \, bB_3 \ldots aA_{x-1} \rho_s bB_x)_1$

.
.
.

$(\rho_s bB_1 \, aA_2 \, bB_3 \ldots aA_{x-1} \rho_s bB_x)_v$ (matching layer)
Substrate where A and B generally designate quarter-wave layer thicknesses of said dielectric materials, a and b designate layer thickness design factors consisting either of $a = \frac{2}{3}$ and $b = 4/3$ or $a = 4/3$ and $b = \frac{2}{3}$, x designates a preselected number of layers in each reflecting stack, $v$ designates a preselected number of reflective stacks in said coating, and $\rho_s$ designates a detuning factor having a value either less than or greater than one and prearranged in accordance with said preselected angle such that either the low or high wavelength transition edges of the spectral response of said filter for the two principal polarization planes are substantially aligned.

10. The filter of claim 9, wherein said matching layers adjacent to the substrate and medium are designed to reduce secondary reflectance bands in a bandpass region of interest and wherein the optical thicknesses of selected ones of said A and B layers are refined to reduce secondary reflectance bands in a bandpass region of interest.

11. In a fiber optic communication system employing wavelength division multiplexing,
   at least a pair of optical signal transmitters for producing optical signal beams having at least two different wavelengths $\lambda_a$ and $\lambda_b$;
   a wavelength multiplexer receiving said optical signal beams for combining said beams into a single wavelength division multiplexed beam having at least two signal components at wavelengths $\lambda_a$ and $\lambda_b$;
   a fiber optic transmission link for transmitting said wavelength division multiplexed beam;
   a wavelength demultiplexer receiving said wavelength division multiplexed beam for splitting said beam into demultiplexed optical signal beams having at least two different wavelengths $\lambda_a$ and $\lambda_b$;
   at least a pair of optical signal detectors for separately receiving said demultiplexed optical signal beams;
   said wavelength multiplexer including at least one thin film optical filter disposed at a preselected angle to each of said optical signal beams and adapted to transmit one of said signal beams having wavelength $\lambda_a$ to a multiplexed signal beam path and to reflect the other of said signal beams having wavelength $\lambda_b$ to said multiplexed signal beam path;
   said wavelength demultiplexer including at least one thin film optical filter disposed at a preselected angle to said wavelength division multiplexed beam and adapted to transmit the $\lambda_a$ wavelength component thereof to a first demultiplexed signal beam path and to reflect the $\lambda_b$ wavelength component thereof to a second demultiplexed signal beam path;
   each of said thin film optical filters comprising a transparent substrate having a surface; and a multilayer thin film optical coating formed on said surface and having an edge filter optical response characterized by a high reflectance region including wavelength $\lambda_b$ and a high transmittance region including the wavelength $\lambda_a$ and a non-polarizing transition edge at an intermediate wavelength $\lambda_c$, said multilayer thin film coating including a plurality of symmetric dielectric periods, each comprising a preselected number of alternate layers of a first higher refractive index dielectric material and a second lower refractive index dielectric material having respective optical thicknesses preselected to produce a spectral response characteristic for signal beams incident at said preselected angle having separate bandpass regions with separated low and high wavelength transition edges for the two principal polarization planes if the first and last layers of said periods were to have tuned optical thickness, said first and last layers being formed to detuned optical thicknesses preselected in accordance with said preselected angle of incidence to shift either said low wavelength transition edges or said high wavelength transition edges substantially into alignment.

12. In a fiber optic communication system employing a duplex signal transmission path using wavelength division multiplexing, a first and a second station each having at least one optical signal transmitter and at least one optical signal detector, said transmitters at said stations producing output optical signal beams at two different wavelengths $\lambda_a$ and $\lambda_b$;

a fiber optic transmission link for transmitting a duplex wavelength division multiplexed beam between said stations;

a duplex beam splitter at each of said stations for separating transmitted and received optical signals, said beam splitter including at least one thin film optical filter disposed at a preselected non-normal angle to said optical signal beams and adapted to transmit one of said signal beams having wavelength $\lambda_a$ and to reflect the other of said signal beams having wavelength $\lambda_b$;

said thin film optical filter comprising a transparent substrate having a surface, and a multilayer thin film optical coating formed on said surface and having an edge filter optical response characterized by a high reflectance region including wavelength $\lambda_b$ and a high transmittance region including the wavelength $\lambda_a$ and a non-polarizing transition edge at an intermediate wavelength $\lambda_c$, said multilayer thin film coating including a plurality of symmetric dielectric periods, each comprising a preselected number of alternate layers of a first higher refractive index dielectric material and a second lower refractive index dielectric material having respective optical thicknesses preselected to produce a spectral response characteristic for signal beams incident at said preselected angle having separate bandpass regions with separated low and high wavelength transition edges for the two principal polarization planes if the first and last layers of said periods were to have tuned optical thicknesses, said first and last layers being formed to detuned optical thicknesses preselected in accordance with said preselected angle of incidence to shift either said low wavelength transition edges or said high wavelength transition edges substantially into alignment.

* * * * *